United States Patent Office 3,527,920
Patented Sept. 8, 1970

3,527,920
WELDING OF ALLOY STEELS
Karl E. Dorschu, Basking Ridge, N.J., assignor to Air Reduction Company, Incorporated, New York, N.Y., a corporation of New York
No Drawing. Continuation-in-part of application Ser. No. 366,702, May 12, 1964, which is a continuation-in-part of application Ser. No. 284,453, May 31, 1963. This application Mar. 21, 1968, Ser. No. 714,778
Int. Cl. B23k 35/00
U.S. Cl. 219—137                        9 Claims

ABSTRACT OF THE DISCLOSURE

A consumable wire electrode for arc welding high impact resistant, low alloy steels, having yield strength of approximately 90,000 to 100,000 pounds per sq. in. in a principally inert gas atmosphere, has a composition for achieving exceptional weld impact resistance, together with yield strength matching or slightly exceeding that of the low alloy steel plate, comprising in percentage of total weight, 0.06 to 0.09 carbon; 1.25 to 1.45 manganese; 0.35 to 0.55 silicon; 1.80 to 2.20 nickel; 0.40 to 0.55 molybdenum, and 0.010 to 0.025 titanium, the balance being essentially iron and residual traces of several other elements.

---

This application is a continuation-in-part of my copending application Ser. No. 366,702, filed May 12, 1964, now Pat. No. 3,404,249, that, in turn, is a continuation-in-part of my application Ser. No. 284,453, filed May 31, 1963, on which Pat. No. 3,215,814 issued Nov. 2, 1965 for "Welding of High Yield Strength Steel."

This invention relates to improvements in welding wire for low alloy steels, particularly for gas-shielded metal arc welding of exceptionally high impact resistant, low alloy steels of moderately high yield strength.

A wire composition suitable as an electrode for welding certain low alloy steels, and a method for welding with such wire, are disclosed in U.S. Pat. No. 2,810,818, issued Oct. 22, 1957 and owned by the assignee hereof. While the welding wire disclosed in the patent provides welds which in the "as welded" condition have yield strengths and impact resistances which have been acceptable for a number of applications, greater weld toughness has been desired for some time in order to add a greater factor of safety against weldment failure under impact loading. Thus, the accompanying development of welding wire which will have, in the as-welded condition, the required yield strength for matching the yield strength of the steels to be joined, together with materially higher impact resistance.

As used herein, the terms "matching" and "over-matching," refer to yield strength of the weld as compared with that of the low alloy steel plate or work. It is believed that in some instances an unfavorable stress state may occur between the weld and plate where the yield strength of the weld over-matches, i.e., is materially higher than, that of the steel plate. This unfavorable situation could affect the performance of such weldments adversely while in service. Under-matching of course, is to be avoided. Accordingly, it is desirable that the yield strength of the weld match, i.e. be approximately equal to or closely approach, the yield strength of the low alloy steel.

In referring to high impact resistance, the application contemplates especially the magnitude of resistance to impact at low temperature, or the lowness of the temperature at which resistance to a standard impact is still retained.

A principal object of the present invention is to provide a welding wire of new composition for exceptionally tough welds that compatibly join moderately high yield strength, high impact resistant, low alloy steels, without significantly over-matching the yield strength thereof, especially where exceptional toughness, rather than extremely high yield strength of the weldment is required, and that can be heat treated for stress-relief annealing without deterioration of the strength and toughness of the weldment.

A related object is to provide matching yield strength, and especially high impact resistance of welds joining strong, high impact resistant low alloy steels to an extent where the welds are comparable in yield strength to the yield strength of the steels they join, and that these welds have exceptionally good impact resistance.

These and other objects, features and advantages of the invention will be apparent from the following more detailed description thereof.

According to the invention, a welding wire composition is provided which is eminently suitable for achieving exceptionally tough and strength-matching welds joining certain high impact resistant, low alloy steels, particularly those in the yield strength vicinity of approximately 90,000 to 100,000 pounds per sq. in. (p.s.i.). In a general aspect of the invention, the wire composition is by percentage weight analysis of elements in the respective ranges: 0.06 to 0.09 carbon; 1.25 to 1.45 manganese; 0.35 to 0.55 silicon; 1.80 to 2.20 nickel; 0.40 to 0.55 molybdenum; 0.010 to 0.025 titanium and balance essential iron. The specific analysis of course, in practice includes some residual elements, such as phosphorus (0.01 maximum), sulphur (0.01 max.), vanadium (0.03 max.), chromium (0.15 max.) and aluminum (0.025 max.). In particular, no aluminum is intentionally added to the melt for making the wire; nor are any chromium or copper (in contrast with considerable prior practice) intentionally added to the melt.

All residual elements are kept as low as practically possible and, where present, can be limited to the amounts achieved by good steel-making practice. The wire composition contains approximately 95% iron minimum, by weight.

By using a welding wire composition of the foregoing analysis, the desired results can be achieved without certain disadvantageous requirements and limitations of prior art procedures and practices. More specifically, the present invention avoids any:

(1) Requirement of low carbon content in the wire, specifically any stringent limitation to 0.05% carbon as the maximum.
(2) Necessity of resorting to a vacuum melting procedure in preparing the wire heat.
(3) Requirement to maintain low residual deoxidants.
(4) Restriction to use of the non-consuming electrode inert gas shielded arc welding process.
(5) Necessity of abnormal or unduly costly control of the amount of the phosphorus and sulphur content of the wire.

In the preferred case the weld metal composition of the present invention is used as consumable electrode wire for inert gas shielded arc welding of steels of the type referred to. Such wire is sold and used as a spooled coil adapted to be fed as bare wire to the welding arc. The preferred process by which the wire is deposited is the inert gas shielded consumable electrode process employing reverse polarity and inert shielding gases as disclosed in Muller et al. U.S. Pat. No. 2,504,868, granted Apr. 18, 1950, and owned by the assignee hereof. Other satisfactory processes include inert gas shielded straight or reverse polarity consumable electrode processes using emissive additives as disclosed in Muller U.S. Pat. No. 2,694,763. Additional forms of shielding gases which are preferred for consumable electrode arc welding with the present wire are disclosed in U.S. Pats. Nos. 3,143,631 and 3,143,630, both granted to Sohn and Robinson, that describe the addition of a minor quantity of oxygen or a minor quantity of carbon dioxide respectively, to the inert gas shield, usually argon.

Also preferred for certain applications such as out-of-position welding and welding of thin-gauge materials, is the so-called "pulsed power" process disclosed in Anderson and Greene Pat. No. 3,071,680, wherein molten weld metal is intermittently discharged from the wire electrode to the work piece at comparatively low average current.

The present wire may also be deposited by a non-consuming electrode inert gas shielded arc process, by a submerged arc welding process, or by the "dip transfer" process of U.S. Pat. No. 2,886,696, owned by the assignee hereof. In some applications, other shielding gas mixtures produce satisfactory results, examples being a mixture of argon or helium with or without small additions of carbon dioxide or oxygen, and a mixture of argon and helium, with minor additions of carbon dioxide or oxygen.

It will be understood that the base plates or base metal can be of any composition which is compatible with the composition of the present welding wire. Preferably these base plates are of a ferrous low alloy composition exhibiting high strength and high toughness whereby the full utility of my new wire will be realized because of the overall strength and toughness of the entire resulting weldment.

The present welding wire consists of a steel alloy of the composition set forth above, that can be produced by conventional melt techniques. The alloy is prepared in the usual way to obtain the desired proportions of the major alloying elements, melting being effected in air or gas atmosphere and vacuum melting, vacuum pouring and vacuum degassing being unnecessary. Immediately before pouring the heat, ferro-titanium alloy or metallic titanium in amount specified below is added by thrusting it below the surface of the melt; after the ferro-titanium alloy or metallic titanium has been added, the heat is poured and solidified in the usual manner to form ingots from which wire is produced by hot rolling, followed by wire drawing in known manner.

The proportion of equivalent titanium herein used is a definite departure from prior practice in weld wire manufacture. For example, 1.8 pounds of equivalent titanium per ton of laboratory melt had been used for purposes of obtaining satisfactory properties after stress-relief annealing following welding. However, according to such practice excessive titanium remains in the melt and hence in the wire, with consequent tendency toward reduction in impact resistance and toughness of the weld metal as deposited.

It has been found that the addition of 0.6 to 1.5 pounds of equivalent titanium per ton of laboratory melt in the above described manner results in a residual titanium content of 0.010 to 0.025 percent by weight in the finished welding wire. This range of titanium content is found to be optimum in the specified composition of the present welding wire for greatly improved weld metal toughness, notwithstanding the comparatively low amount of nickel used in the wire composition.

Summarizing, where exceptional toughness, or ability to absorb impact energies (especially at low temperatures), is of prime importance but unusually high yield strength is not required, as where the yield strength of the steel being welded is itself not unusually high and should not be over-matched by the weld, I have found that the requisite exceptional toughness can consistently be achieved if there be observed the above-specified critical welding-wire content of 0.010 to 0.025 percent titanium by weight, meanwhile keeping the other essential elements in the proportions specified.

By way of example, a welding wire was prepared (following such preparation techniques as described above) having a composition in percentage by weight-analysis, of 0.08 carbon; 1.27 manganese; 0.38 silicon; 1.90 nickel; 0.43 molybdenum; 0.016 titanium, and balance, except for residual elements, essentially iron. The residuals included phosphorus, 0.005; sulphur, 0.007; vanadium, 0.02; chromum, 0.06; and aluminum, 0.010. Residuals appear as unavoidable factors in commercial steel-making practice, i.e., as impurities in the melt and/or residue of conventional oxidizers.

As used in the specific composition above, the amounts by weight of nickel, manganese and molybdenum are related to each other approximately in the ratio 4.5:3:1 respectively, which, when used with the critical content of titanium above, together with median amounts of specified carbon and silicon, is found to be outstanding for achieving desired yield strength (90,000 to 100,000 p.s.i.) and exceptional toughness in the weld metal as hereinafter described.

It is to be understood that the composition of weld metal deposited as above from the present welding wire, even if undiluted by the base metal being welded, will nevertheless vary somewhat from the analysis of the wire itself; the variance is due to some loss in the oxidizable elements the lost portion of which disappears as slag or gas, or both, to an extent which increases with increase of the oxidizing component of the shielding gas employed during welding. Thus in the preferred gas atmosphere, a welding wire of the composition above, formed a weld metal having a composition in percentage by weight analysis of: 0.07 carbon; 1.08 manganese; 0.32 silicon; 1.95 nickel; 0.51 molybdenum; and a slight undetermined amount of titanium, the balance being essentially iron and residual elements, including phosphorus, sulphur, and chromium in smaller amounts than indicated for the wire above, nitrogen 0.012, and vanadium and aluminum in slight undetermined amounts.

For the purpose of evaluating the physical properties of test specimens of the deposited weld metal from the present electrode wire, suitable tensile test specimens and suitable standard Charpy-V-notch specimens were removed from the weldment and destructively tested for yield strength and also for toughness characteristics measured in terms of foot pounds of energy absorbed in a pendulum-type Charpy test fixture as more fully described in my Pat. No. 3,215,814.

By test of actual welds made according to a preferred gas shielded metal-arc process, above, typical strength and toughness properties of the weld metal deposited in HY–80 steel plate of 2 inch thickness were found to be:
Yield strength, 100,000 p.s.i.
Tensile strength, 108,000 p.s.i.

Charpy V-notch energy in foot pounds absorbed at

40° F. _____ 130
     0° F. _____ 121
    —40° F. _____ 107
    —60° F. _____ 77

These properties were obtained from weld metal deposited in the flat position with a welding wire of 1/16 inch diameter and arc shielding gas of argon and 2% oxygen. The HY–80 specification calls for a minimum yield strength of 80,000 p.s.i., but in practice the yield strength is in general higher.

Achieving of exceptional weld toughness and desired strength is not limited to a metal-arc process as used above for flat position welds. Excellent properties were also obtained from out-of-position welds using the "pulsed-power" process of Pat. No. 3,071,680 with a similar arc shielding gas and 0.045 inch diameter welding wire. Typical properties of weld metals so deposited in similar steel plate of 2 inch thickness in both vertical and over-head weld positions, were as follows:

|  | Vertical position, p.s.i. | Overhead position, p.s.i. |
| --- | --- | --- |
| Yield strength [1] | 95,000 | 96,000 |
| Tensile strength [1] | 112,000 | 111,000 |
| Charpy V-notch energy in foot pounds absorbed at— | | |
| 80° F | 117 | 157 |
| 0° F | 96 | 146 |
| −20° F | 83 | 131 |
| −60° F | 74 | 128 |

[1] Transverse tensile properties.

It will be recognized from the test evaluation data above, that these weld metals in all instances exceed the minimum weld strength (88,000 p.s.i.) required for HY–80 steel welds. The welds therefore, will have the desired yield strength combined with unusually high impact resistance, for suitable strength-matching welding of high impact resistant, low alloy steels of the strength class in question, including compatible steels having generally similar yield strength (90,000 to 100,000 p.s.i.) and high impact resistance characteristics; also that the weld metals are especially suitable where it is desirable that the impact resistance and toughness of the weld materially exceed that of the steel plate itself, even though the respective yield strengths are suitably matched.

It will also be recognized upon comparison of the Charpy impact data above, and the standard minimum impact resistance required of welds for HY–80 and T–1 steels, i.e. absorption of 20 ft. lbs. at −60° F., together with known energy absorption properties (ranging between about 25 and 55 foot pounds at −60° F.) attained by others for commercial welds of such steels, that the marked increase in impact resistance of the present welds for steels in the moderately high yield strength (approximately 90,000 to 100,000 p.s.i.) range amounts to a striking and unexpected improvement in this area.

The yield strengths attained by weld metals made in accordance with this invention are seen to approximate the general range of 90,000 to 100,000 p.s.i., thus matching closely the upper yield strength of HY–80 low alloy steels; also the resistance to impact is exceptionally high for such welded steels. The weld metals are, in fact, tougher than any known low alloy steel weld metals previously used in this practice. There is therefore achieved by the invention a consumable wire electrode eminently suitable for welding without over-matching the yield strength of low alloy steels generally at the HY–80 class, and also certain existing quenched and tempered steels such as T–1 steel. By "T–1 steel" is meant one of the special categories of T-steels, which are a U.S. Steel Corporation ferrous plate material of excellent mechanical properties that are obtained through a critical balance of small amounts of alloying elements in the iron (manganese, nickel, chromium, molybdenum and boron) and by hot rolling followed by a quench-and-temper heat treatment.

The described properties of welds made with the present welding wire can be obtained when those welds are made, basically speaking, according to Pat. No. 2,504,868 above. The patent discloses the basic inert gas shielded, metal arc welding method which, combined with the use of the herein disclosed wire composition, gives as-welded resulting metal compositions having the desired chemical and physical properties. Summarzing, suitable and preferred welding conditions for the wire composition of the present invention include, depending on the character and position of the work-piece, the use of either the pulsed-power axial spray identified above, or a spray type arc with reverse-polarity direct current, an argon-1% to 2% oxygen non-turbulent inert gas shield, and a wire feed rate in excess of 100 inches per minute.

One form of apparatus generally suitable for such welding is described in the parent case, U.S. Pat. No. 3,215,814. It is sufficient here merely to mention that a bare wire electrode of the present composition is fed to a welding gun that also directs the protective shield of inert gas around the molten electrode metal and the deposited hot weld metal. Any losses of alloying ingredients between the electrode and the weld bead through oxidation or otherwise, are eliminated or kept very small by this welding technique.

With the present invention a weld for low alloy steels is achieved with a high rate of deposition, which can be used as welded without heat treatment, which has moderately high yield strength for matching that of the steel plate, and exceptional toughness and resistance to impact that heretofore had not been achieved in the general yield strength range of 90,000 to 100,000 p.s.i. The weld itself is not subject to cracking, and where stress-relief annealing is desired for the welded work, it can be heat treated without loss of its yield strength and impact resistant properties since the weld is vanadium-free.

In practice the invention meets certain critical needs, not heretofore met, in welds for special applications of strong, low alloy steels of the class in question, where unusually low temperatures are, or may be encountered. Examples of such applications include hydrospace vehicles, pressure vessels, military armour plate, earth moving equipment, commercial nuclear reactor components, thick walled cylinders, and structural steel work (bridges, buildings, etc.), where, in addition to the required yield strength, exceptional toughness and impact resistance for ensuring against shock failure during very low temperature conditions is a prime consideration.

While a preferred embodiment of the invention has been described, it will be apparent that variations of the welding wire composition within the respective percentage ranges indicated above, may be made without departing from the spirit and scope of the invention as set forth in the following claims.

I claim:

1. A welding electrode wire having a composition consisting essentially of, in approximate percentage of total weight, 0.06 to 0.09 carbon; 1.25 to 1.45 manganese; 0.35 to 0.55 silicon; 1.80 to 2.20 nickel; 0.40 to 0.55 molybdenum; and 0.01 to 0.025 titanium, the balance being essentially iron.

2. A process of welding a low alloy ferrous metal which comprises arc welding said metal in a principally inert gas atmosphere with a consumable wire electrode consisting essentially of, in approximate percentage of total weight, 0.06 to 0.09 carbon; 1.25 to 1.45 manganese; 0.35 to 0.55 silicon; 1.80 to 2.20 nickel; 0.40 to 0.55 molybdenum, and 0.01 to 0.025 titanium, the balance being essentially iron.

3. A welding electrode wire having a composition consisting essentially of, in percentage of total weight, carbon of the general order of $\frac{1}{14}$ of 1%, manganese of the general order of $1\frac{3}{8}$%, silicon of the general order of $\frac{1}{2}$ of 1%, nickel of the general order of 2%, molybdenum of the general order of $\frac{1}{2}$ of 1%, and titanium between $\frac{1}{100}$ and $\frac{1}{40}$ of 1%, the balance being essentially iron.

4. A welding electrode wire consisting of a steel alloy having a composition consisting essentially of in percentage of total weight, carbon of the general order of $\frac{1}{14}$ of 1%, silicon of the general order of $\frac{1}{2}$ of 1%, nickel, manganese and molybdenum related to each other approximately in the ratio 4.5:3:1 respectively, and having a combined percentage of total weight within the approximate range of $3\frac{1}{2}$% to 4% and titanium between $\frac{1}{100}$ and $\frac{1}{40}$ of 1%, the balance being essentially iron.

5. A process of welding a low alloy ferrous metal which comprises arc welding said metal in a principally inert gas atmosphere with a consumable wire electrode consisting essentially of in approximate percentage of total weight 0.08 carbon; 1.27 manganese; 0.38 silicon; 1.90 nickel; 0.43 molybdenum; 0.016 titanium, and the balance essentially iron and residual elements.

6. A welding wire for welding high impact resistant low alloy steels in the yield strength range of 90,000 to 100,000 p.s.i., the wire consisting essentially of, in approximate amount by percentage of total weight analysis, 0.08 carbon; 1.27 manganese; 0.38 silicon; 1.90 nickel; 0.43 molybdenum; 0.016 titanium; residual elements in combined total not exceeding approximately 0.10, and the balance essentially iron.

7. A welding wire as specified in claim 6 that is arc-deposited as a low alloy ferrous weld metal for making up a welded joint for high-impact resistant low alloy steel, the weld metal comprising in approximate percentage of total weight, 0.07 carbon; 1.08 manganese; 0.32 silicon; 1.95 nickel; 0.51 molybdenum; a trace of titanium, and the balance essentially iron.

8. An arc-deposited low alloy ferrous weld metal as specified in claim 7, wherein the metal is deposited in a principally inert gas atmosphere by a metal arc process and forms a weld for steel plate having a yield strength of about 90,000 to 100,000 p.s.i., and the weld metal has energy absorption capacity for resisting impact of approximately 77 foot pounds at $-60°$ F. by standard Charpy V-notch test, and a yield strength closely matching that of the steel plate.

9. An arc-deposited low alloy ferrous weld metal as specified in claim 7, wherein the metal is deposited in a principally inert gas atmosphere by a pulsed power axial spray arc for making out-of-position welds for steel plate having a yield strength of about 90,000 to 100,000 p.s.i., and the welds have energy absorption capacities for resisting impact of from approximately 74 foot pounds to 128 foot pounds at $-60°$ F. by standard Charpy V-notch test.

References Cited

UNITED STATES PATENTS

| 2,810,818 | 10/1957 | Rothschild | 75—123 |
| 3,162,751 | 12/1964 | Robbins | 219—145 X |
| 3,368,887 | 2/1968 | Enis et al. | 219—145 X |

JOSEPH V. TRUHE, Primary Examiner

G. A. MONTANYE, Assistant Examiner

U.S. Cl. X.R.

219—145

UNITED STATES PATENT OFFICE
CERTIFICATE OF CORRECTION

Patent No. 3,527,920          Dated September 8, 1970

Inventor(s) Karl E. Dorschu

It is certified that error appears in the above-identified patent and that said Letters Patent are hereby corrected as shown below:

Column 5, lines 11 and 12, delete the ≈ (wavy lines before 20°F and 60°F) and in lieu thereof put a minus sign.

(SEAL)
Attest:

Edward M. Fletcher, Jr.

Attesting Officer

WILLIAM E. SCHUYLER, JR.
Commissioner of Patents